United States Patent
Izumo et al.

(10) Patent No.: US 9,841,313 B2
(45) Date of Patent: Dec. 12, 2017

(54) LEVELING MECHANISM FOR WEIGHING DEVICE

(71) Applicant: A&D Company, Limited, Tokyo (JP)

(72) Inventors: Naoto Izumo, Saitama (JP); Akiyoshi Ota, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/255,677

(22) Filed: Sep. 2, 2016

(65) Prior Publication Data
US 2017/0074719 A1 Mar. 16, 2017

(30) Foreign Application Priority Data

Sep. 11, 2015 (JP) ................. 2015-179772

(51) Int. Cl.
*A47B 91/02* (2006.01)
*G01G 23/00* (2006.01)
*G01G 21/28* (2006.01)
*G01G 19/56* (2006.01)

(52) U.S. Cl.
CPC ........... *G01G 23/00* (2013.01); *A47B 91/024* (2013.01); *G01G 21/28* (2013.01); *G01G 19/56* (2013.01)

(58) Field of Classification Search
CPC ...... A47B 91/02; A47B 91/024; G01G 21/28; G01G 19/56; G01G 23/00
USPC .................. 248/188.2, 188.4, 649, 650, 677; 177/126, 128, 238, 239
See application file for complete search history.

(56) References Cited

U.S. PATENT DOCUMENTS

| 4,219,089 A * | 8/1980 | Gard | G01G 3/1406 |
| | | | 177/128 |
| 4,274,500 A * | 6/1981 | Kuhnle | G01G 19/4144 |
| | | | 177/126 |
| 5,332,182 A * | 7/1994 | Weisz | G01G 23/002 |
| | | | 248/188.4 |
| 6,407,351 B1 | 6/2002 | Meyer et al. | |
| 7,290,741 B1 * | 11/2007 | Cox | A47B 91/06 |
| | | | 248/188.4 |

(Continued)

FOREIGN PATENT DOCUMENTS

| CN | 202903314 U | 4/2013 |
| JP | 62-5620 | 2/1987 |

(Continued)

*Primary Examiner* — Tan Le
(74) *Attorney, Agent, or Firm* — Roberts Mlotkowski; Safran Cole & Calderon P.C.

(57) ABSTRACT

Provided is a leveling mechanism for a weighing device that facilitates horizontal leveling of the weighing device. The leveling mechanism (2) includes a foot piece (10) having a foot portion (11) that in contact with an installation surface and a foot piece shaft (12) that extends upward from the foot portion and has a male screw (14) on its outer periphery, a rotatable body (20) having on its inner periphery a female screw, a housing (30) for accommodating the rotatable body engaged with the foot piece, a fixing portion (S2, 36) for fixing the housing to a device case (3), and a housing space (6) covering the housing, provided in the device case. The leveling mechanism converts a rotational motion of the rotatable body to a vertical motion of the foot piece.

5 Claims, 8 Drawing Sheets

(56) References Cited

U.S. PATENT DOCUMENTS

| | | | | |
|---|---|---|---|---|
| 8,550,637 B2* | 10/2013 | Seki | ............... | G03B 21/54 |
| | | | | 248/188.2 |
| 2006/0006295 A1* | 1/2006 | Gainer | ............ | F16M 11/10 |
| | | | | 248/188.4 |
| 2017/0074719 A1* | 3/2017 | Izumo | ............ | G01G 21/28 |

FOREIGN PATENT DOCUMENTS

| | | |
|---|---|---|
| JP | 62-10661 Y | 3/1987 |
| JP | 62-45145 Y2 | 12/1987 |
| JP | 63-15533 B2 | 4/1988 |
| JP | 63-51254 B2 | 10/1988 |
| JP | 1-24588 Y2 | 7/1989 |
| JP | 3-11712 Y2 | 3/1991 |
| JP | 3-30833 Y2 | 6/1991 |
| JP | 04291123 A | 10/1992 |
| JP | 6-28656 Y2 | 8/1994 |
| JP | 3341234 A | 5/1998 |
| JP | 3783424 B2 | 3/2000 |
| JP | 4861070 B2 | 12/2007 |
| JP | 2007333606 A | 12/2007 |

* cited by examiner

LEVELING MECHANISM FOR WEIGHING DEVICE

TECHNICAL FIELD

The present invention relates to a leveling mechanism for a weighing device for installing the weighing device horizontally.

BACKGROUND ART

A weighing device such as a scale detects a product of mass and gravity as force when the direction of gravitational acceleration is a constant, and detects weight, based on the mass of a standard weight, while assuming the same gravity of the standard weight is applied to a weighing object. Therefore, for performing accurate weighing, horizontal leveling for gravity vector alignment is performed when the scale is installed.

Figure 11:
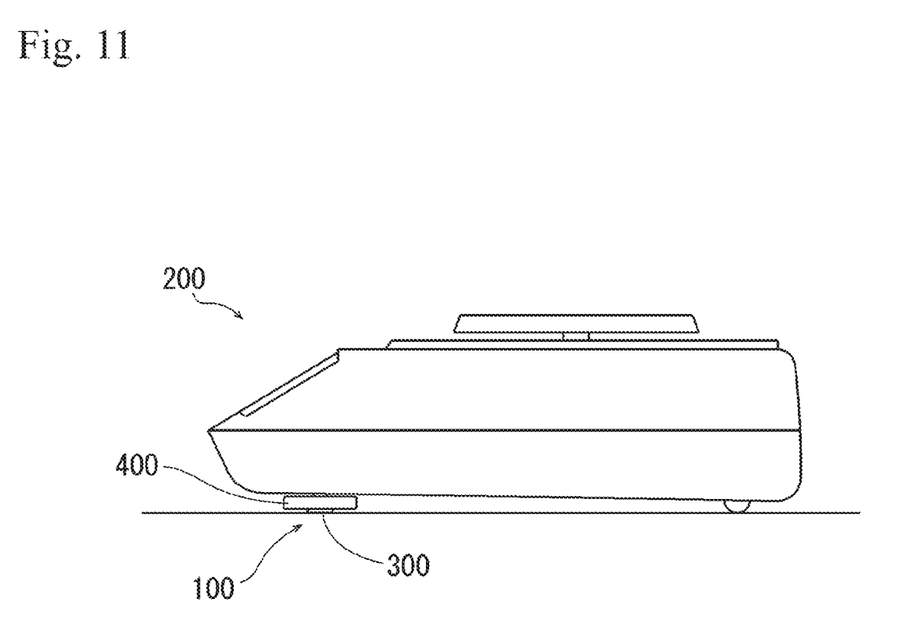
FIG. 11 A schematic view showing a leveling mechanism of a conventional scale.

Generally, horizontal leveling of a scale is performed by a height adjustment of an adjustor foot (hereinafter, referred to as a foot piece) installed on a bottom surface of a lower case of a scale case 200 that is housing of a weight sensor. As shown in FIG. 11, the foot piece 100 is simply formed of a foot portion 300 that is in contact with an installation surface of the weighing device and has a male screw of its shaft. By rotating an operating portion 400 that extends radially from the shaft by fingers, the foot portion 300 is housed in or projected from a female screw formed on the case 200, and the height adjustment is performed (refer also to Patent Document 1).

PRIOR ART DOCUMENT

Patent Document

[Patent Document 1] JPA 2007-333606

SUMMARY OF THE INVENTION

Problem(s) to be Solved by the Invention

The foot piece 100 as shown in FIG. 11 serves a simple leveling mechanism. However, such foot piece adjusts height directly by a rotational motion of the screw, and therefore has an inconvenience that the foot portion 300 is rotated together with rotation of the operating portion 400, the rotation causes friction with the installation surface, and the scale itself moves along with the screw rotation. Moreover, in the case where the frictional resistance is strong because of the material of the installation surface or the device has a heavy weight, a further problem is that the foot portion 300 has a large rotational resistance. The operating portion 400 becomes unlikely to rotate, and those make the horizontal leveling difficult.

The present invention has been made in order to solve the problems described above, and provides a leveling mechanism for a weighing device that facilitates horizontal leveling of the weighing device, that is, provides a new foot piece that facilitates horizontal leveling and a suitable device case therefor.

Means for Solving the Problem(s)

In order to solve the problems described above, in a mode of the present invention, a leveling mechanism for a weighing device includes a device case for accommodating a weight sensor, a foot piece that has a foot portion in contact with an installation surface and a foot piece shaft that extends upward from the foot portion and has a male screw on an outer periphery of the shaft, a rotatable body that has, on an inner periphery of the body, a female screw for engaging with the male screw, a housing for accommodating the rotatable body engaged with the foot piece, a fixing portion for fixing the housing to the device case, and a housing space covering the housing, provided on the device case.

In the leveling mechanism, it is also preferable that the device case is formed of an upper case and a lower case each having a mutually fitting structure, and the housing is fixed to a lower surface of the upper case by means of the fixing portion.

In the leveling mechanism, it is also preferable that the housing is disposed in an area outside a fitting portion of the upper case and lower case.

In the leveling mechanism, it is also preferable that an inner surface of the housing and the fitting portion of the upper case and lower case at a position to form the housing space extend in an inward direction of the device case in a shape of a semi-ellipse, when viewed horizontally.

In the leveling mechanism, it is also preferable that a retainer is formed on the foot piece shaft.

In the leveling mechanism, it is also preferable that the male screw of the foot piece shaft and the female screw of the rotatable body are threaded in reverse directions.

In another mode of the present invention, a leveling mechanism for a weighing device includes a device case that is formed of an upper case and a lower case each having a mutually fitting structure for accommodating a weight sensor, a foot piece that has a foot portion in contact with an installation surface and a foot piece shaft that extends upward from the foot portion and has a male screw on an outer periphery of the shaft, a rotatable body that has, on an inner periphery of the body, a female screw for engaging with the male screw, a housing for accommodating the rotatable body engaged with the foot piece, a fixing portion for fixing the housing to the device case, and a housing space covering the housing, provided on the device case, wherein the weight sensor is fixed to the upper case, and the housing is fixed by means of the fitting portion to the upper case, not to the lower case.

Effects of the Invention

According to the leveling mechanism for the weighing device of the present invention, an adjustor foot (a foot piece) that adjusts the weighing device in height is formed of a unit capable of converting a horizontal rotational motion to a vertical linear motion, so that horizontal leveling of the weighing device can be performed easily.

EMBODIMENTS FOR IMPLEMENTING INVENTION

Next, a preferred embodiment of the present invention will be described.

Figure 1:
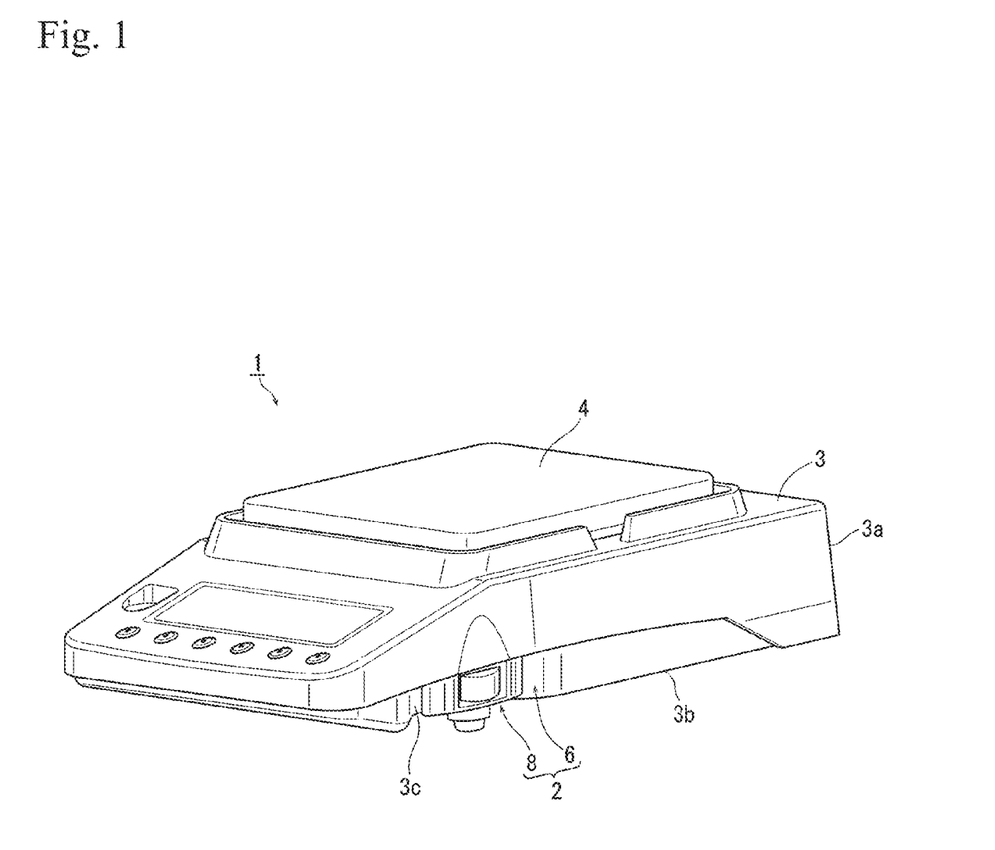
FIG. 1 A right perspective view of a scale provided with a leveling mechanism according to an embodiment.

In FIG. 1, reference symbol 1 denotes a scale that is one of the weighing devices. The scale 1 has a main body formed of a case 3 (device case) in appearance, and the main body accommodates a weight sensor 9*a* (refer to FIG. 10). A weighing pan 4 is exposed from the case 3, and the load of a weighing object placed on the weighing pan 4 is transmitted to the weight sensor 9*a* via a pan shaft (not shown).

The scale 1 is in contact with an installation surface of the scale 1 at three points, one point is a stationary foot 7 (refer to FIG. 9) that is formed of a portion of an upper case 3*a* and is provided at a central position of a rear side of the scale and the other points are two foot piece units 8 and 8 each provided at left and right points of a front side of the scale. Adjustment in height is performed by means of the foot piece unit 8.

Next, a leveling mechanism 2 provided on the scale 1 will be described. The leveling mechanism 2 includes a foot piece unit 8 and a housing space 6 for the unit 8.

The foot piece unit 8, as shown in FIG. 2 to FIG. 8, includes a foot piece 10, a rotatable body 20, and a housing 30.

The foot piece 10 has a foot portion 11 that is in contact with the installation surface and a foot piece shaft 12 that extends upward from the foot portion 11. The foot portion 11 and the foot piece shaft 12 are, for example, integrally molded by zinc die-casting. The foot portion 11 is in a columnar shape, and a lower side of the foot portion 11 is formed into a truncated conical shape. Two parts of the foot portion 11 circumferentially equally spaced are subjected to flattening to be formed with a so-called width across flats. The foot piece shaft 12 is likewise formed with a width across flats at positions circumferentially shifted by 90 degrees from those of the width across flats of the foot portion 11. In a lower surface of the foot portion 11, a hole to fit in a rubber plug 13 is formed, and the foot portion 11 is in contact with the installation surface with high frictional resistance by the rubber plug 13. The foot piece shaft 12 has a male screw 14 on its outer periphery. The male screw 14 is formed with a left-handed screw which is threaded opposite to a normal screw direction.

The rotatable body 20 is in a hollow disk shape, and has a female screw (not shown) on its inner periphery. This female screw is also formed with a left-handed screw which is threaded opposite to a normal direction. In an outer surface of the rotatable body 20, a plurality of recess portions extending vertically are formed, for use a better finger hold, at even intervals in circumferential direction. The rotatable body 20 is molded of an ABS resin.

Figure 2:
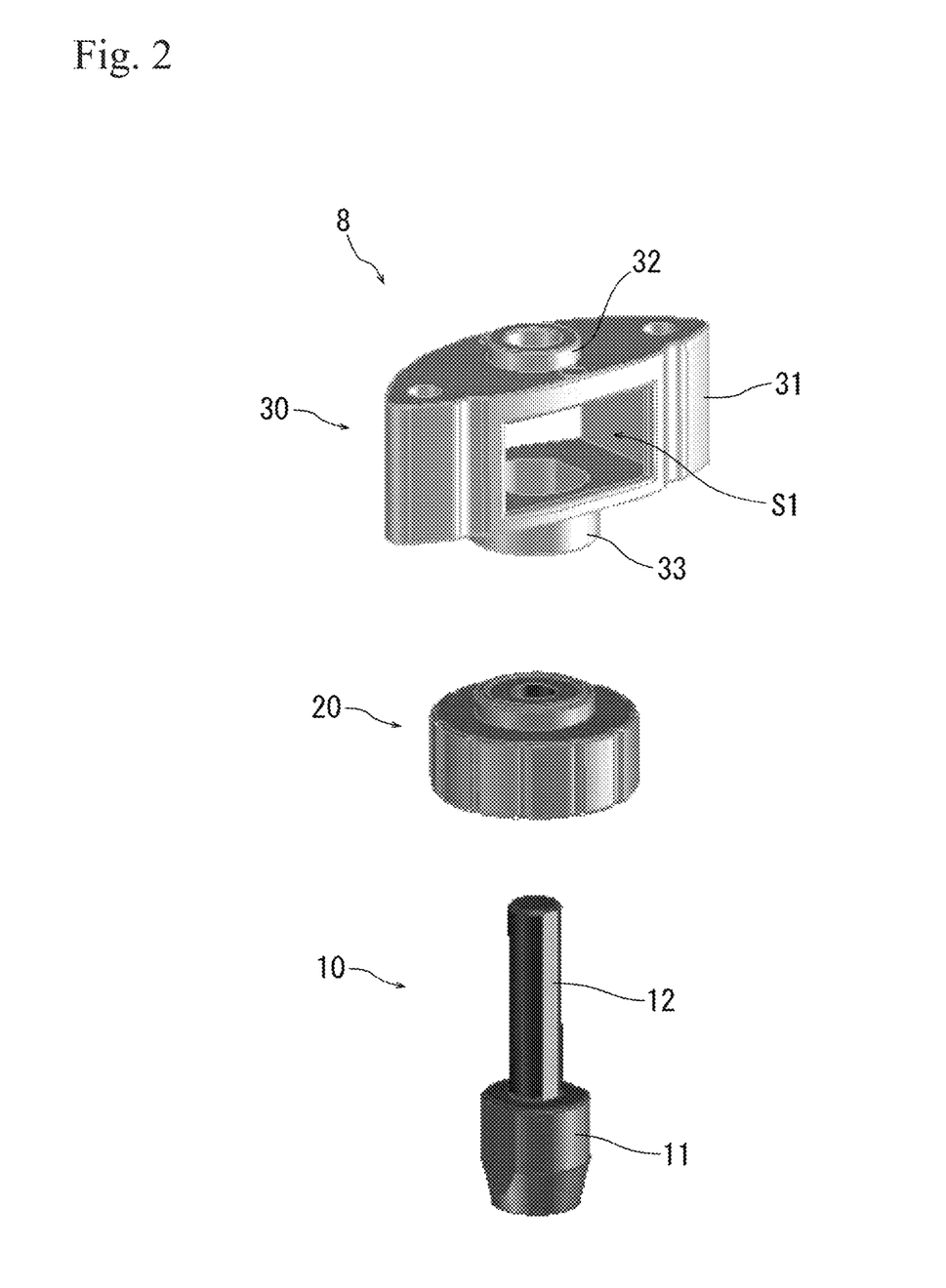
FIG. 2 An exploded perspective view of the leveling mechanism of FIG. 1.
Figure 3:
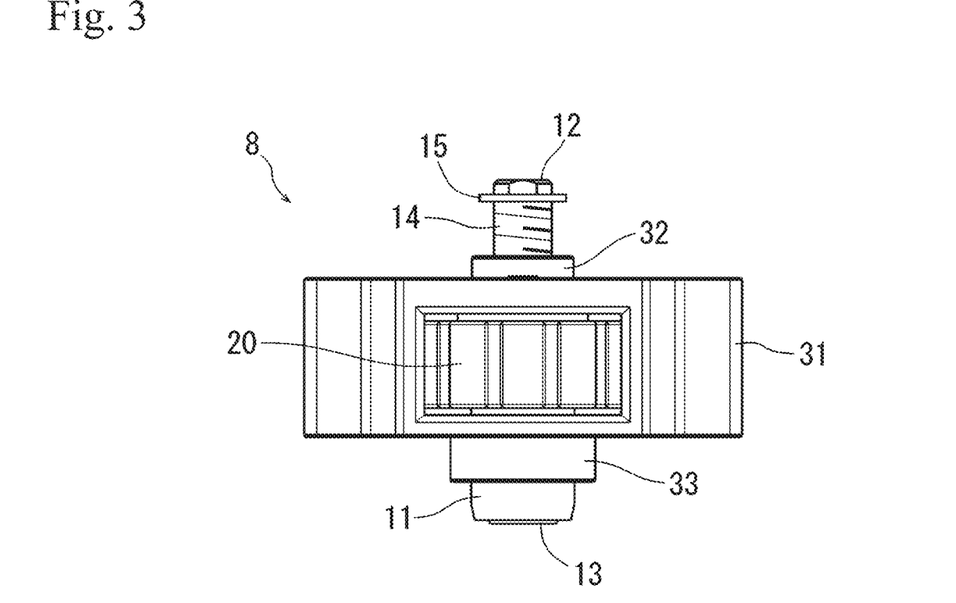
FIG. 3 A front view of the leveling mechanism of FIG. 1.
Figure 5:
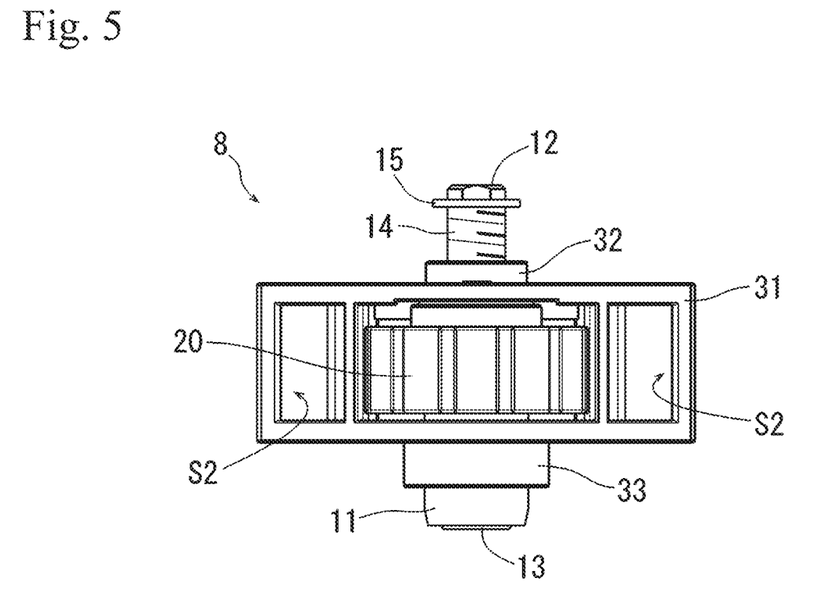
FIG. 5 A back view of the leveling mechanism of FIG. 1.

The housing 30 houses the foot piece 10 and the rotatable body 20 screwed with each other, and includes a main body portion 31, an upper rib 32, and a lower rib 33. The main body portion 31, the upper rib 32, and the lower rib 33 are integrally molded of an ABS resin or the like. A horizontal section of the main body portion 31 is formed so as to be in a substantially elliptical shape. The main body portion 31, as shown in FIG. 2 and FIG. 5, includes a central space S1 that opens in both inward and outward direction and left-right spaces S2 that open only in the inward direction. The "inward and outward" in the present specification means directions in a state where the foot piece unit 8 is assembled.

Figure 4:
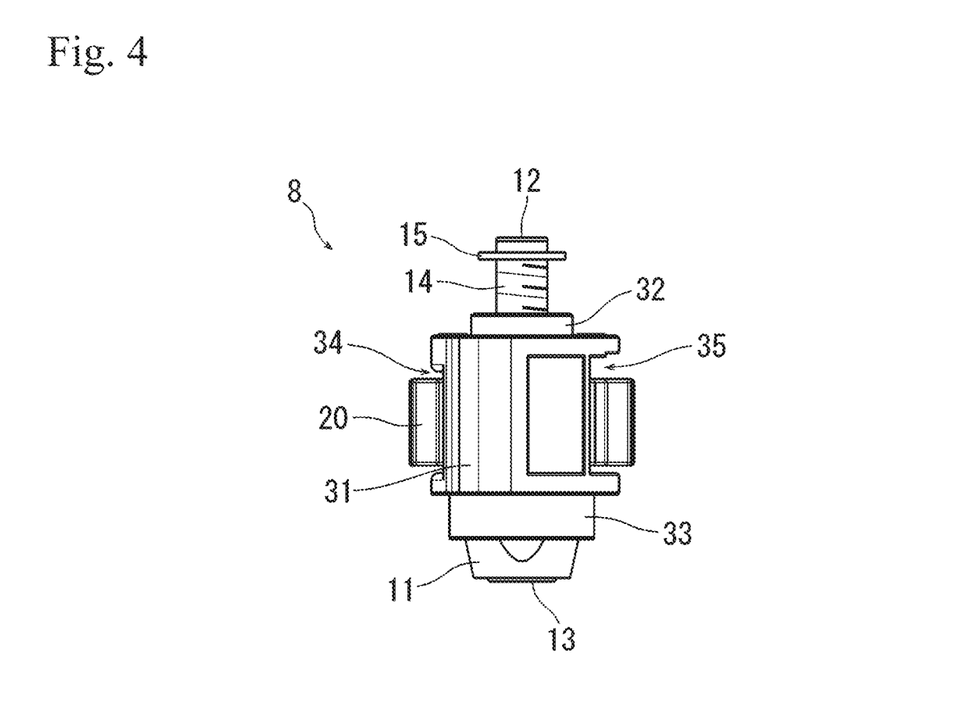
FIG. 4 A right side view of the leveling mechanism of FIG. 1.
Figure 6:
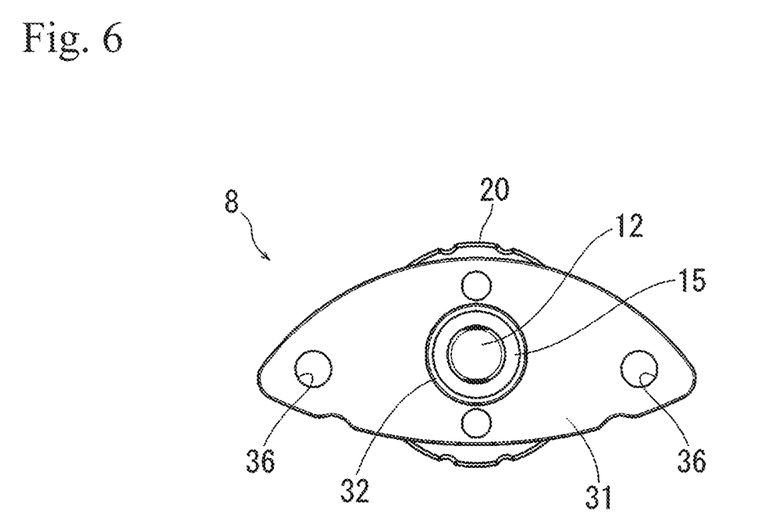
FIG. 6 A top view of the leveling mechanism of FIG. 1.
Figure 7:
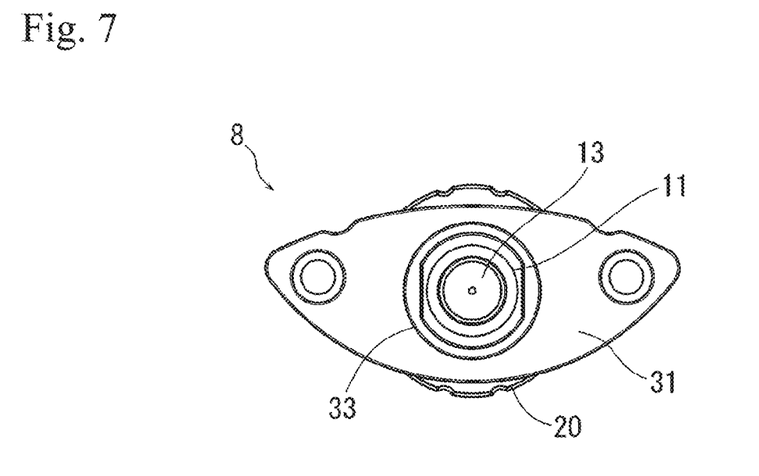
FIG. 7 A bottom view of the leveling mechanism of FIG. 1.
Figure 8:
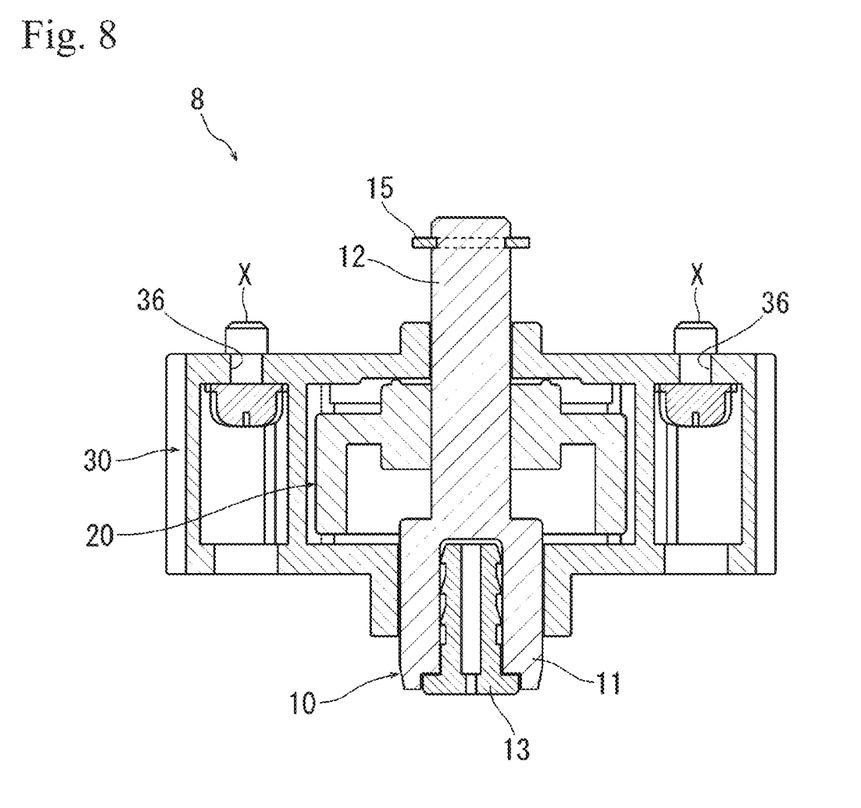
FIG. 8 A sectional view of the leveling mechanism of FIG. 1.

The central space S1 is formed for housing the rotatable body 20, and as shown in FIG. 4, formed such that an inner opening portion 35 is larger than an outer opening portion 34. The inner opening portion 35 is used for inserting the rotatable body 20 during assembly, and the outer opening portion 34 is used for exposing the rotatable body 20 minimumly for operation. Each of the left-right spaces S2 is formed so as to act as a fixing portion for fixing the housing 30 securely to the case 3. At an upper portion of the left-right space S2, as shown in FIG. 6 and FIG. 8, screw holes 36 are formed. Each of the upper rib 32 and the lower rib 33 is formed at a substantially central portion of the main body portion 31, and acts as a guide hole for inserting the foot piece 10. Two parts of an inner surface of the upper rib 32 circumferentially equally spaced are subjected to flattening, the flattening-parts are coincident with the width across flats of the foot piece shaft 12, and the coincidence acts as a whirl stop. An inner surface of the lower rib 33 is also coincident with the width across flats of the foot portion 11, and acts as a whirl stop.

In this manner, the foot piece unit 8 of the embodiment is formed such that a horizontal rotational motion of the rotatable body 20 is converted to a vertical linear motion of the foot piece 10 by means of the foot piece 10 provided with the screw structure for height adjustment, the rotatable body 20 acting as an operating portion, and the housing 30 being a member to support the foot piece 10 and the rotatable body 20, so that the foot piece 10 does not be rotated during operation of the rotatable body 20. That is, a rotational torque of the rotatable body 20 accompanying the adjustment operation is not transmitted to the installation surface, so that inconvenience that the scale 1 is shifted due to the adjustment operation and the operator has to retry the horizontal leveling can be avoided. Also, stable horizontal leveling can be performed regardless of a difference in friction coefficient of the installation surface.

The foot piece unit 8 is formed of three components of the foot piece 10, the rotatable body 20, and the housing 30, and formed of a single foot unit independent of the main body of the scale 1. The foot piece unit 8 can be assembled separate from an assembling process of the scale 1, so that productivity of the scale is increased.

By the way, the foot piece unit 8 is a unit independent of the main body of the scale 1 as described above and itself has a required size, so that it is necessary to cope with a problem of a space interference with the scale case 3 and a problem of the assembly rigidity of the scale 1. So, hereinafter, a mode of the case 3 suitable for the space to dispose the foot piece unit 8 and a fixing means thereof will be described.

The case 3 is a box in substantially rectangular shape for accommodating the weight sensor 9*a*, and is formed of a vertically fitting structure of the upper case 3*a* with a lower case 3*b*. The weight sensor 9*a* is fixed to the upper case 3*a*. Regarding the weight sensor 9*a*, the embodiment shows an electromagnetic balance type, however any sensors that a weighing signal according to a load placed on the weighing pan 4 can be obtained, including a strain gauge type and a capacitance type, may be used. The weight sensor 9*a* is screwed to the upper case 3*a* via a shock absorber 9*b* in a leaf spring-like shape (refer to FIG. 10) in the embodiment, however, as the fixing means, another fixing means thought by a skilled technician may be adopted. Therefore, the upper case 3a is required certain rigidity, and integral molding of an aluminum die-casting is preferable from the view point of the rigidity and the degree of freedom of forming. For the lower case 3b, press working of stainless steel or the like is preferable from the viewpoint of low thermal conductivity, waterproofing and anticorrosion properties. The lower case 3b acts as a cover body of a downward open portion of the upper case 3a, and the scale 1 is hermetically sealed by fitting the upper case 3a and the lower case 3b with waterproofing and dustproofing properties.

In the case 3, the housing space 6 for the foot piece unit 8 is formed by the shape of the upper case 3a and the lower case 3b. The housing space 6 is formed adjacent to the case 3.

Figure 9:
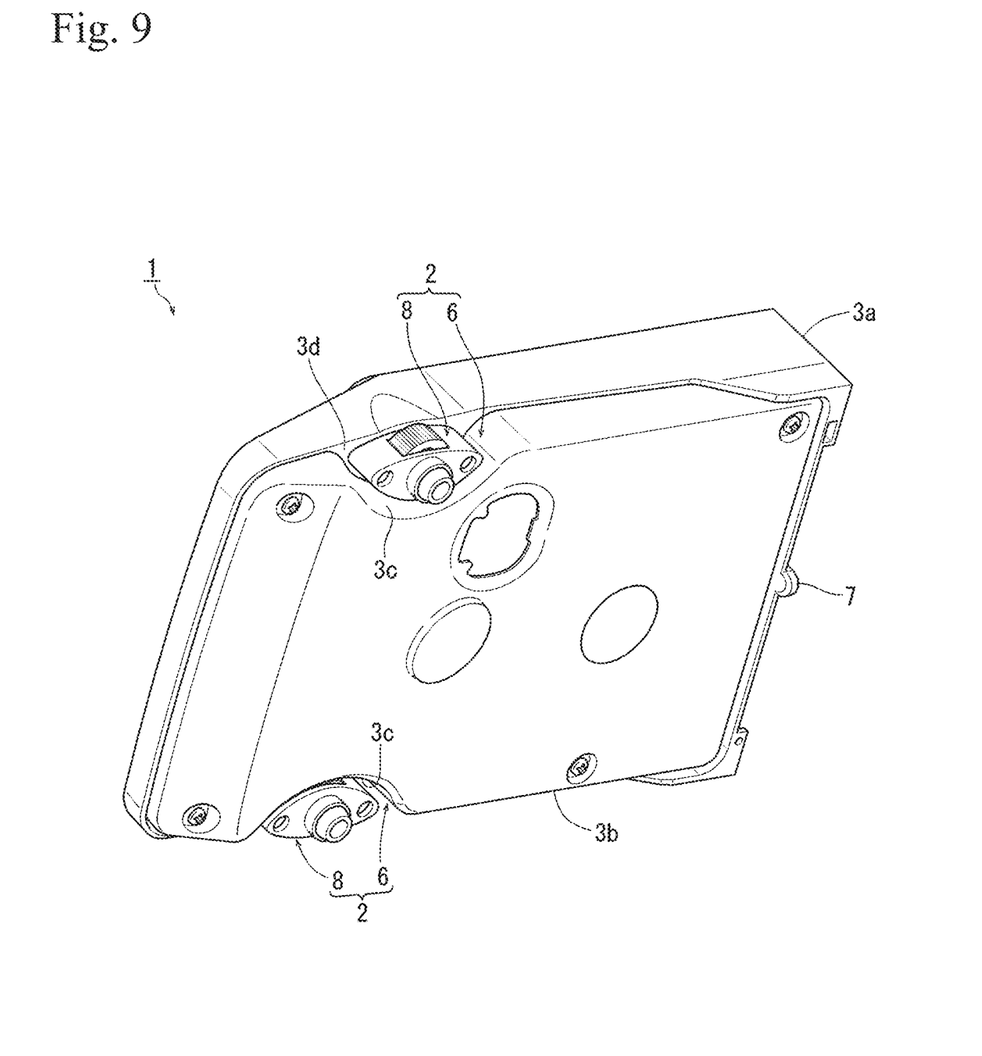
FIG. 9 A lower perspective view of the scale of FIG. 1.
Figure 10:
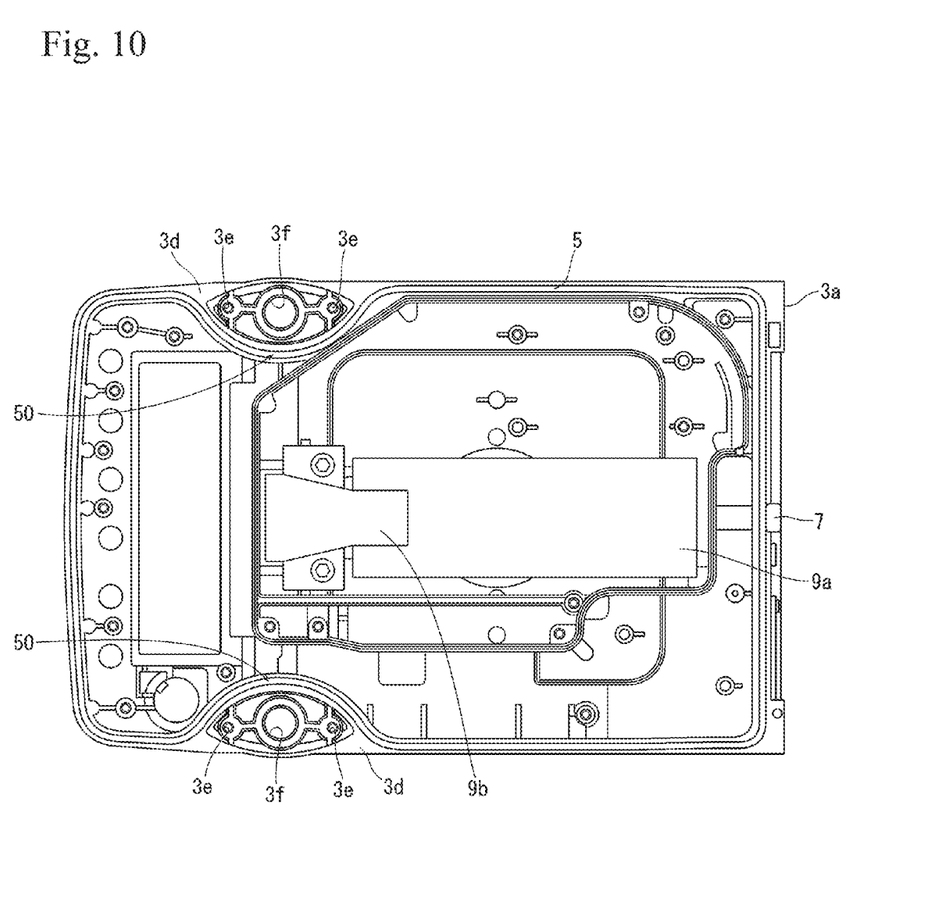
FIG. 10 A bottom view of an upper case of the scale of FIG. 1.

As shown in FIG. 9, an external shape of the upper case 3a and the lower case 3b is in a roughly rectangular shape, however, among them, the lower case 3b has semi-elliptical dent portions 3c that recesses inwardly to the device case 3 of the scale 1 at the forward portions of each left and right surfaces. A space defined by the dent portion 3c of the lower case 3b and a top plate portion 3d formed by a lower surface of the upper case 3a covering the dent portion 3c is the housing space 6 for the foot piece unit 8. As shown in FIG. 10, in each of the top plate portions 3d of the upper case 3a, screw holes 3e formed at positions corresponding to the through-holes 36 of the foot piece unit 8 and a relief hole 3f for the foot piece shaft 12 of the foot piece unit 8 are formed.

As shown in FIG. 10, a fitting groove (fitting portion 5) is provided at the lower end edge of the upper case 3a throughout the periphery thereof away from the housing spaces 6. Although illustration is omitted, also at the upper end edge of the lower case 3b, a similar fitting groove (fitting portion) is provided throughout the periphery thereof. The upper case 3a and the lower case 3b are fitted with a sealing material such as silicone rubber interposed in the fitting portion 5. Fitting portions 50 (refer to FIG. 10) of the upper case 3a and the lower case 3b at positions to form the housing space 6 each is formed in a semi-elliptical shape extending inwardly to the inside of the device, and each has a gradual successive curve shape. Therefore, the sealing material disposed in the fitting portion 50 is assembled while receiving uniform pressure over the entire circumference by the fitting of the upper and lower cases. Thus, even when the foot piece unit 8 is newly disposed, the airtightness of the fitting portion 50 in the housing space 6 is never reduced, and the waterproofing and dustproofing performance of the scale 1 is kept maintained.

Since the maintaining the airtightness described above is taken into consideration, in the foot piece unit 8, the housing 30 is formed in a substantially elliptical shape in horizontal cross section. The shape of an inner surface of the housing 30 is a semi-elliptical shape with a radius of curvature of approximately 40 mm, and is not formed in a rectangular shape as to have corner portions produced in the horizontal cross section or a perfect circular shape to have a large curvature. The housing 30 is formed such that the shape of an outer side surface thereof has a smaller radius of curvature than that of the inner side surface in the horizontal section. Therefore, in external appearance, the foot piece unit 8 is housed in the external form of the scale 1 in a well-coordinated manner.

While the weight sensor 9a is fixed to the upper case 3a, when a foot piece is fixed to the lower case 3b, expansion and contraction of the lower case 3b may affect the weighing accuracy. In the embodiment, the weight sensor 9a is fixed to the upper case 3a, and the foot piece unit 8 is fixed to the upper case 3a, not to the lower case 3b. That is, by supporting the upper case 3a provided with the weight sensor 9a directly by means of the foot piece unit 8, rigidity of the scale 1 is improved, and the weighing accuracy can also be maintained.

According to the leveling mechanism 2, the foot piece unit 8 is disposed not in an interior of the case 3 defined by the upper case 3a and the lower case 3b but out of the case 3 (out of the fitting portion 5). Therefore, replacement and repair can be performed in units or in respective components of the foot piece 10, the rotatable body 20, and the housing 30, without dissembling the case 3 (without canceling the fitting of the upper case 3a and the lower case 3b).

According to the leveling mechanism 2, mounting of the foot piece unit 8 is performed by inserting the rotatable body 20 from the inner opening portion 35 into the central space S1 of the housing 30, screwing therewith the foot piece 10 by using the lower rib 33 and the upper rib 32 of the housing 30 as a guide, and fixing to the upper case 3a by fixing screws X (refer to FIG. 8) from the left-right space S2 of the housing 30. Therefore, the number of components is increased as compared with that of the conventional foot piece 100 in FIG. 11, but the unit 8 is simple in structure, and a user can perform the replacement and repair by oneself.

According to the leveling mechanism 2, the male screw 14 of the foot piece shaft 12 and the female screw of the rotatable body 20 have a relationship of mutually opposite handed screw threads, so that the scale 1 united with the housing 30 falls when the rotatable body 20 is rotated clockwise, the scale 1 rises when the rotatable body 20 is rotated counterclockwise. Thus, height adjustment can be performed with an operation feeling similar to that with the conventional foot piece 100 in FIG. 11. In addition, at a substantially top portion of the foot piece shaft 12, a washer 15 (refer to FIG. 3 etc.,) acting as a retainer of the foot piece 10 for preventing the rotatable body 20 from dropping from the foot piece shaft 12 is provided for a user who is not accustomed to adjustment operation. By providing the washer 15, inconvenience that the unit falls apart due to an over-rotation of the rotatable body 20 when the inexperienced user performs adjustment can be avoided.

While an embodiment of the leveling mechanism 2 having a case structure provided with the foot piece unit 8 and the housing space 6 therefor has been described above, this is an example of the present invention, and various modifications can be made based on the knowledge of a skilled technician. For example, points where the leveling mechanism 2 is installed are exemplified with two left and right points in the front side of the upper case 3a, but it is also possible to install the leveling mechanisms at four corners of the upper case 3a, to install the leveling mechanisms at two or more points of the outer peripheral of the upper case 3a including the two left and right points in the front side, or to provide stationary feet such as those denoted by reference symbol 7 at two left and right points in the front side of the upper case 3a and install the foot piece units 8 at two left and right points in the rear side of the upper case 3a.

Since the foot piece unit 8 of the embodiment is a height adjustment unit independent of the device main body, the foot piece unit 8 is not limited to the scale 1. The foot piece unit 8 can be adopted, with high versatility, to another devices that are necessary to perform a horizontal leveling, including experimental devices, production machinery, desks and projectors by forming the housing space 6 on their device case. From this, initial costs such as design cost and dies cost can be reduced.

DESCRIPTION OF SYMBOLS

1 Scale
2 Leveling mechanism
3a Upper case
3b Lower case
3c Dent portion
3d Top panel portion
5 Fitting groove (fitting portion)
6 Housing space
8 Foot piece unit
9a Weight sensor
10 Foot piece
11 Foot portion
12 Foot piece shaft
14 Male screw
15 Washer (retainer)
20 Rotatable body
30 Housing
31 Main body portion
32 Upper rib
33 Lower rib
34 Outer opening portion
35 Inner opening portion
36 Through-hole (fixing portion)
S1 Central space
S2 Left-right space (fixing portion)
50 Fitting portion of upper and lower cases in position to form housing space

The invention claimed is:

1. A leveling mechanism for a weighing device comprising:
a device case for accommodating a weight sensor that is formed of an upper case and a lower case, the upper and lower cases each having fitting portions that mutually interfit to join the upper and lower cases together;
a foot piece that has a foot portion in contact with an installation surface and a foot piece shaft that extends upward from the foot portion and has a male screw on an outer periphery of the shaft;
a rotatable body that has, on an inner periphery of the body, a female screw for engaging with the male screw;
a housing for accommodating the rotatable body engaged with the foot piece;
a fixing portion for fixing the housing to the device case; and
a housing space covering the housing, provided on the device case,
wherein the weight sensor is fixed to the upper case, and the housing is directly fixed by means of the fixing portion to the upper case, not to the lower case such that the foot piece is directly connected to the upper case via the housing,
wherein thermal expansion and contraction of the lower case does not interfere with a weighing accuracy of the weighing sensor.

2. The leveling mechanism for the weighing device according to claim 1, wherein the housing is disposed in an area outside a fitting portion of the upper case and lower case.

3. The leveling mechanism for the weighing device according to claim 2, wherein an inner surface of the housing and the fitting portion of the upper case and lower case at a position to form the housing space extend in an inward direction of the device case in a shape of a semi-ellipse, when viewed horizontally.

4. The leveling mechanism for the weighing device according to claim 3, wherein a retainer is formed on the foot piece shaft.

5. The leveling mechanism for the weighing device according to claim 1, wherein the male screw of the foot piece shaft and the female screw of the rotatable body are threaded in reverse directions.

* * * * *